Patented Oct. 2, 1951

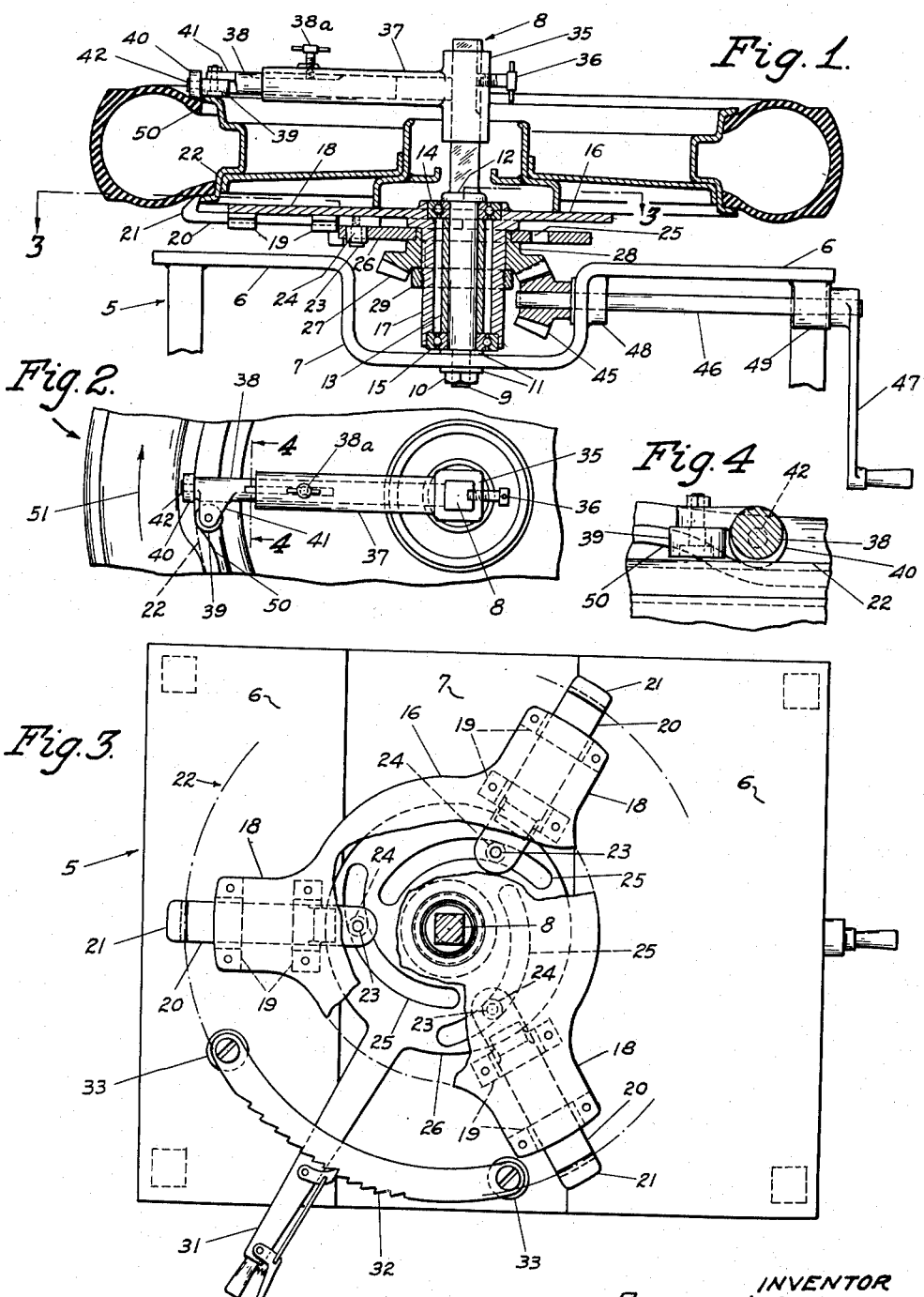

2,569,788

UNITED STATES PATENT OFFICE 2,569,788

CIRCUMFERENTIALLY TRAVELING TYPE, PEDESTAL MOUNTED, TIRE MOUNTING DEVICE

Raymond A. Weaver, Los Angeles, Calif.

Application December 9, 1946, Serial No. 714,932

2 Claims. (Cl. 157—1.24)

This invention relates to a tire mounting device.

The invention relates to a modification of, and in certain respects an improvement upon, the tire mounting machine described and claimed in my co-pending application for patent on tire mounting machines, filed in the United States Patent Office July 12, 1946, Serial No. 683,222, now abandoned.

Among the objects of the present invention are to provide a better means for clamping the vehicle wheel to the rotatable support upon which it is mounted, which support is turned by the workman so as to turn with it the tire carrying wheel, when said wheel is to be turned sufficiently to force the partly applied tire down into fully applied position in relation to the rim of the wheel; to simplify and consolidate the structure so that it will occupy less floor space; to provide a superior means for clamping the vehicle wheel to its aforesaid turnable support; and to provide a superior means for mounting in a stationary manner the carrier of the two co-operating rollers which act upon the tire to force it into its fully applied position.

Other objects, advantages and features of invention will hereinafter appear.

Referring to the accompanying drawing which illustrates a preferred embodiment of the invention, Fig. 1 is a vertical mid-section of the complete machine except that parts thereof are shown in elevation.

Fig. 2 is a plan view of a fragment of the structure shown in Fig. 1.

Fig. 3 is a transverse section on angular line 3—3 of Fig. 1, with a part broken away more clearly to disclose underlying structure.

Fig. 4 is a fragmental sectional detail taken on line 4—4 of Fig. 2.

Referring in detail to the drawing, the device is mounted upon a table-like support 5 having a top plate 6 across the mid-width portion of which is a depressed part 7. Above the central portion of said trough or depressed part 7 is mounted a non-rotatable post 8, said post having a diametrically reduced lower end portion 9 which extends through an aperture provided for it in said depressed part 7, a clamping nut 10 being applied to the lower end of said part 9, said nut, in cooperation with bosses or washers 11 securely holding said post in an upstanding position.

At about its mid-length said post 8 has around it, preferably as an integral part thereof a rib or collar 12. Between the uppermost of the aforesaid washers 11 and said rib there is interposed a spacing sleeve 13 together with the inner rings of roller bearing structures 14 and 15, therefore, when the nut 10 is tightened said bearing structures are both securely clamped in place.

A wheel supporting and clamping structure is provided which includes a horizontally extending mounting plate 16 having a central, tubular downward extension 17. This tubular extension is internally recessed around both its upper and its lower end in such a manner as to fit tightly around and between the outer bearing rings of the two already mentioned bearing structures 14 and 15 so that said tubular part and the outer bearing rings turn together. Said wheel mounting plate 16 is provided with circumferentially equidistant radial extensions 18, a set of three of these being shown. Each of these extensions carries a pair of underlying bearing loops 19, each pair of loops carrying a radially adjustable wheel rim clamping arm 20 which has a hooked outer end 21 to engage the wheel rim 22. Each of said arms 20 carries at its inner end a downwardly directed pin 23 which, in turn, has rotatably mounted upon it an antifriction roller 24 with a working fit within the subjacent cam slot 25 of a cam plate 26. Said cam plate 26, together with a bevel gear 27, is mounted concentrically of the already mentioned tubular part 17 of the wheel-supporting plate 16, said gear having a circumferentially recessed, upwardly directed hub 28 which is loosely fitted into a circular hole provided for it in the cam plate 26, said gear being fixed to the tubular part 17. A nut 29 is shown secured around said tubular part underlying said gear, said nut, when tightened keeping the gear in place.

Said cam plate 26 is provided with a radial operating arm 31 which cooperates with an arcuate ratchet toothed member 32 which spans the space between two adjacent extensions 18 of the wheel supporting plate 16 suitable conventional fastening means 33 being used to secure this toothed segment to said extensions. Said handle 31 is shown in an underlying relation to the arcuate toothed member 32.

A tool carrier is provided which includes a sleeve 35 secured in place upon the longitudinally grooved upper end of the post 8 by means of a manually operable set screw 36. Said sleeve 35 carries a radially extending tubular arm 37 which in turn has telescoped into its outer end a carrier arm 38 held in place by a set screw device 38a. Said arm 38 has mounted upon its outer end portion a leading roller 39 which rotates in a horizontal plane and a trailing roller 40 which rotates in a vertical plane. The leading roller 39 is carried by a bifurcation 41 of said arm 38, and the trailing roller 40 is carried by a pin resulting from a diametrically reduced end portion 42 of the carrier arm 38, so that said trailing roller rotates about the axis of said arm 38 and sleeve 37. These two rollers act upon the tire 43 in a manner described later.

The driven bevel gear 27 has already been mentioned, said gear surrounding and being fixed to the tubular part 17 of the turnable wheel-supporting plate 16. With said bevel gear meshes a driving bevel gear 45 contained within the table top depression 7 and fixed to a shaft 46 which, in turn, has secured to it an operating crank 47, bearings 48 and 49 being provided for said shaft. This shaft may, if preferred, be motor driven instead of crank operated.

Preparatory to putting a vehicle wheel into place upon the machine the workman will swing the arm 31 to the right (Fig. 3) thus radially expanding the wheel rim gripping hooks 21 so that the wheel rim may be laid in place between them upon the plate 16. Then, while holding the wheel rim against rotation with one hand he will swing the arm 31 of the cam plate leftward, thus tightening said hooks upon the rim of the wheel, this tightening action resulting from the tangential inclination of the three outcurved cam slots 25 in relation to the center of the cam plate.

After the wheel rim has been mounted and gripped in place, as aforesaid, the tire to be applied thereto is looped over that side portion of the wheel adjacent to the rollers 39 and 40. Thereupon, with the bead 50 of the tire in the relation to the two rollers shown best in Figs. 2 and 4, the crank 47 is operated to rotate the vehicle wheel in the direction indicated by the arrow 51 in the left part of Fig. 2. This will cause the leading roller 39 to press the inner face of the bead 50 over the wheel rim. Then the following or trailing roller 40 travels along the outer edge of said bead and in doing so forces the latter into alinement with the inner peripheral face of said rim, so that a complete rotation of the wheel rim and associated tire causes the latter to snap into its fully mounted position.

It will be seen that there is ample room within the hub 52 of the wheel 53 for the post 8, and that the lower end of said hub rests in an even manner upon the supporting plate 16.

I claim:

1. In a machine of the kind described, a support, a post secured thereto and upstanding therefrom, means mounted upon said post in a surrounding relation thereto to support a vehicle wheel to rotate in a horizontal plane, a radially extending arm carried by said post above the place for mounting the vehicle wheel, and two rollers carried by said arm progressively to push outwardly and then laterally into place a pneumatic tire partly mounted upon the rim of said wheel, said rollers traveling circumferentially along the edge of the wheel rim and the bead of the tire, and a pin projecting axially from the outer end of said arm, said pin affording a bearing for one of said rollers around which said one roller rotates.

2. In a machine of the kind described, a support, a post secured thereto and upstanding therefrom, means mounted upon said post in a surrounding relation thereto to support a vehicle wheel to rotate in a horizontal plane, a sleeve surrounding said post above the place for mounting the vehicle wheel, said post having in it a longitudinal groove, a set screw carried by said sleeve, said sleeve being vertically adjustable along said post and said set screw cooperating with the bottom of said groove to maintain the sleeve fixed to said post at any selected height within the range of its adjustment, a horizontal arm carried integrally by said sleeve, and means carried by said arm to push progressively outwardly and then laterally into place a pneumatic tire partly mounted upon the rim of said wheel, the latter means traveling circumferentially along the edge of the wheel rim and the bead of the tire.

RAYMOND A. WEAVER.

REFERENCES CITED

The following references are of record in the file of this patent:

UNITED STATES PATENTS

| Number | Name | Date |
|---|---|---|
| 616,967 | Prescott | Jan. 3, 1899 |
| 965,076 | Carle | July 19, 1910 |
| 1,208,184 | Mayer | Dec. 12, 1916 |
| 1,341,726 | Weaver et al. | June 1, 1920 |
| 1,587,634 | Dickey et al. | June 8, 1926 |
| 1,716,882 | Freivogel | June 11, 1929 |
| 1,793,864 | Manley | Feb. 24, 1931 |
| 1,824,246 | Van Daam | Sept. 22, 1931 |
| 1,995,061 | Hanford et al. | Mar. 19, 1935 |
| 2,197,808 | Mason | Apr. 23, 1940 |
| 2,225,273 | Jacobs | Dec. 17, 1940 |
| 2,351,355 | Merrett | June 13, 1944 |